(12) United States Patent
Mimberg et al.

(10) Patent No.: US 6,947,865 B1
(45) Date of Patent: Sep. 20, 2005

(54) METHOD AND SYSTEM FOR DYNAMIC POWER SUPPLY VOLTAGE ADJUSTMENT FOR A SEMICONDUCTOR INTEGRATED CIRCUIT DEVICE

(75) Inventors: Ludger Mimberg, San Jose, CA (US); Barry Wagner, San Jose, CA (US); Mau Lao, San Jose, CA (US)

(73) Assignee: nVIDIA Corporation, Santa Clara, CA (US)

( * ) Notice: Subject to any disclaimer, the term of this patent is extended or adjusted under 35 U.S.C. 154(b) by 0 days.

(21) Appl. No.: 10/078,292

(22) Filed: Feb. 15, 2002

(51) Int. Cl.[7] .............................................. G01K 1/00
(52) U.S. Cl. ....................................... 702/130; 702/64
(58) Field of Search ........................ 702/130, 64, 132, 702/136, 182–186; 323/277; 307/66; 700/286; 361/104; 326/80, 83

(56) References Cited

U.S. PATENT DOCUMENTS

| | | | |
|---|---|---|---|
| 5,568,350 A | * | 10/1996 | Brown ........................ 361/104 |
| 5,745,375 A | * | 4/1998 | Reinhardt et al. ........... 700/286 |
| 5,757,172 A | * | 5/1998 | Hunsdorf et al. ............ 323/277 |
| 6,025,737 A | * | 2/2000 | Patel et al. ..................... 326/80 |
| 6,304,824 B1 | * | 10/2001 | Bausch et al. ................. 702/64 |
| 6,448,815 B1 | * | 9/2002 | Talbot et al. .................. 326/86 |
| 2001/0045779 A1 | * | 11/2001 | Lee et al. ....................... 307/66 |
| 2002/0113622 A1 | * | 8/2002 | Tang ............................ 326/83 |

* cited by examiner

Primary Examiner—Michael Nghiem
Assistant Examiner—Xiuqin Sun
(74) Attorney, Agent, or Firm—Wagner, Murabito & Hao LLP

(57) ABSTRACT

A processor power supply voltage controller. The controller includes a temperature sensor configured to sense a temperature of a processor and generate a temperature signal in accordance therewith. A regulator is coupled to provide a power supply voltage to the processor. The regulator is coupled to receive the temperature signal and control the power supply voltage to maintain a substantially stable crosstalk level within the processor.

23 Claims, 9 Drawing Sheets

METHOD AND SYSTEM FOR DYNAMIC POWER SUPPLY VOLTAGE ADJUSTMENT FOR A SEMICONDUCTOR INTEGRATED CIRCUIT DEVICE

FIELD OF THE INVENTION

The field of the present invention pertains to digital electronic computer systems. More particularly, the present invention relates to an apparatus for dynamically adjusting operating conditions of a digital electronic circuit to maintain electrical signal characteristics.

BACKGROUND OF THE INVENTION

Digital computers are being used today to perform a wide variety of tasks. Many different areas of business, industry, government, education, entertainment, and most recently, the home, are tapping into the enormous and rapidly growing list of applications developed for today's increasingly powerful computer devices.

As computer systems become increasingly ubiquitous and widespread, there is increasing interest in improving the performance and software execution speed of the computer systems. One of the methods used by designers to increase software execution speed is to increase the processor "clock speed." Clock speed refers to the rate at which digital systems (graphic processor units, central processor units, digital signal processors, etc.) step through the individual software instructions. For example, with many microprocessor designs, one or more instructions are executed per clock cycle. Increasing the number of clock cycles per second directly increases the number of instructions executed per second.

Another method used by designers is to increase the density of the electrical components within integrated circuit dies. For example, many high-performance integrated circuit processors include tens of millions of transistors integrated into a single die (e.g., 60 million transistors or more). As density increases, the clock speeds possible within a given design also increase, for example, as circuit traces are packed ever more closely together.

Another method for increasing performance is to increase the efficiency of heat removal from a high-density, high-performance integrated circuit. As component density increases and clock speed increases, the thermal energy that must be dissipated per unit area of silicon also increases. To maintain high-performance, stable operating temperature must maintained. Accordingly, the use of carefully designed heat dissipation devices (e.g., heat sink fans, liquid cooling, heat spreaders, etc.) with high-performance processors has become relatively standardized.

Performance enhancing techniques, such as increased component density, increased clock speed, and increased heat dissipation, are carefully balanced in order to obtain an optimum performance level. Processor circuit density, processor clock frequency, and thermal dissipation are balanced to provide high-performance while maintaining some margin of safety. For example, if a processor is clocked at too high a frequency, excessive power consumption occurs, leading to overheating of the components of the processor. Over heating leads to computational errors, unpredictable behavior, or even physical destruction of processor. As more and more functions are integrated into ever more densely packed semiconductor dies, the clock speed can be increased, however, the resulting increased switching activity leads to greater heat generation. These factors are balanced to provide an optimal performance for given device.

There exists particular problems, however, with respect to thermal transients and changing thermal conditions. As described above, integrated circuit performance is dependent upon the temperature of the underlying silicon comprising the integrated circuit (e.g., electron mobility, etc.). Generally, for given semiconductor integrated circuit, cooler semiconductor temperatures yields faster performance (e.g., higher electron mobility) than warmer semiconductor temperatures. This effect is often evidenced in the "ramp rate" of the rising edges of various signals within a processor. For example, the rising edges of the clock signal of a cool (e.g., 20C) processor ramp more steeply with respect to time than the rising edges of a hot (e.g., 100C) processor. Performance factors (e.g., clock frequency, component density, thermal dissipation) are typically optimized with respect to expected steady-state operating conditions. This leads to problems when changing temperature conditions are encountered.

One example of a thermal transient is a case where a processor (e.g., of a laptop computer system) is powered up from an "off" state. When a processor is powered-up, power is applied to cold silicon, leading to exceptionally fast performance. In this initially powered state, the excessive ramp rates of the signals can lead to jitter on the rising edges of the signals. The excessive electron mobility and the resulting jitter can cause an unacceptable amount of crosstalk between the circuit traces. This effect is even more problematic in more modern processor dies, having very densely packed, very highly integrated logic components. As component density increases, circuit traces become packed more closely together, and thus become more susceptible to crosstalk. Exceptional amounts of jitter and noise can cause excessive crosstalk.

As described above, design engineers carefully balance increased component density, increased clock speed, and increased heat dissipation to obtain maximum performance. The crosstalk, jitter, and noise caused by changing temperature thus becomes an important performance limiting factor. With prior art schemes, an engineer must design in sufficient performance margin to account for the crosstalk and jitter caused by thermal transients (e.g., startup, etc.). This leads to less than the full performance potential of a given device being obtained.

SUMMARY OF THE INVENTION

Embodiments of the present invention provided a method and system for dynamically controlling power supply voltage coupled to an integrated circuit in response to changing temperature of the integrated circuit. Embodiments of the present invention maintain a stable level of crosstalk, jitter, noise, and the like, across a temperature range, thereby enabling an optimum balance of design factors such as increased component density, increased clock speed, and increased heat dissipation to obtain maximum performance. Embodiments of the present invention reduce the performance limiting effects of crosstalk, jitter, and noise caused by changing temperature.

In one embodiment, the present invention is implemented as a processor power supply voltage controller for throttling a processor's (e.g., GPU, CPU, DSP, etc.) power supply voltage with respect to the processor's temperature. The controller includes a temperature sensor configured to sense a temperature of the processor and generate a temperature signal in accordance therewith. A regulator is coupled to the processor to provide a power supply voltage to the processor. The regulator is also coupled to receive the temperature signal from the temperature sensor and control the power supply voltage provided to the processor in accordance with the temperature signal to maintain a stable performance of the processor. The power supply voltage level is controlled to maintain a stable amount of crosstalk, jitter, noise, and other harmful effects, caused by excessive electron mobility due to the temperature of the semiconductor material comprising the processor.

In one embodiment, the temperature sensor can be implemented as a negative temperature coefficient resistor coupled to sense the thermal environment of the processor (e.g., a heat sink temperature, processor die temperature, PCB temperature, ambient temperature in an enclosure, etc.). The temperature signal can be implemented by using the temperature sensor to control a feedback circuit coupled to the regulator.

In this manner, embodiments of the present invention can adjust for thermal transients caused by, for example, the initial power up of a device. For example, power supply voltage can be decreased when a device is cool, thereby reducing the effects of crosstalk, and increased when the device is hot, thereby compensating for the physical properties of the hot semiconductor material.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Embodiments of the present invention provided a method and system for dynamically controlling power supply voltage coupled to an integrated circuit in response to changing temperature of the integrated circuit. Embodiments of the present invention maintain a stable level of crosstalk, jitter, noise, and the like, across a temperature range, thereby enabling an optimum balance of design factors such as increased component density, increased clock speed, and increased heat dissipation to obtain maximum performance. Embodiments of the present invention reduce the performance limiting effects of crosstalk, jitter, and noise caused by changing temperature. Embodiments of the present invention and their benefits are further described below.

Figure 1:
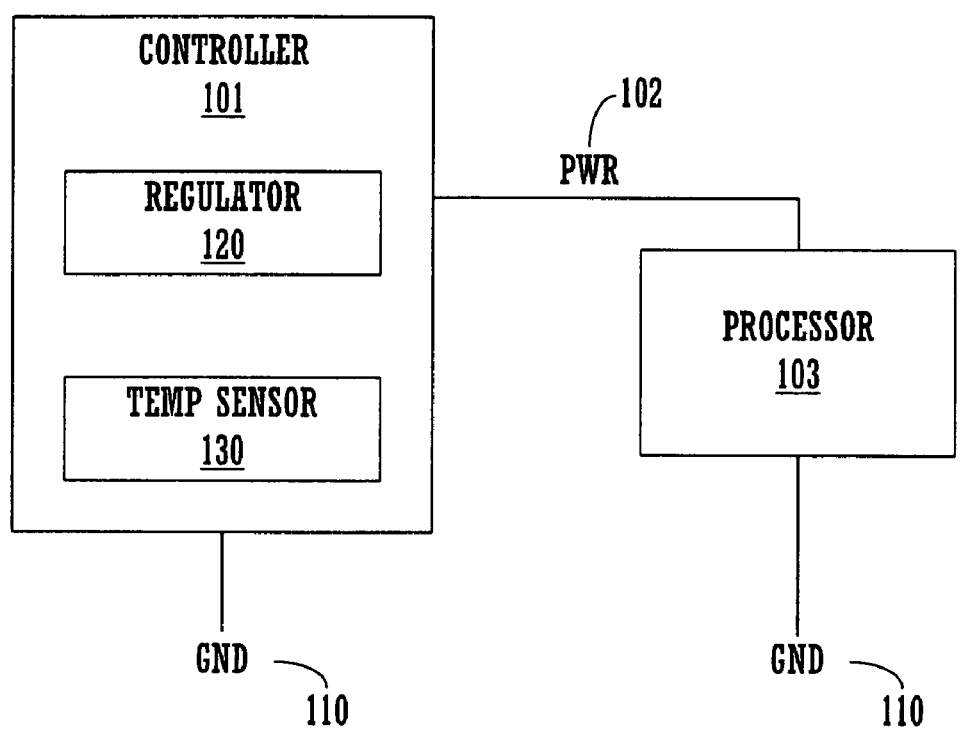
FIG. 1 shows general configuration of a dynamic power supply adjustment system in accordance with one embodiment of the present invention.

FIG. 1 shows a system 100 in accordance with one embodiment of the present invention. FIG. 1 depicts a basic configuration of a system for dynamically controlling power supply voltage coupled to an integrated circuit in response to changing temperature, in accordance with one embodiment of the present invention. As depicted in FIG. 1, system 100 includes a controller 101 coupled to provide a power supply voltage 102 to a processor 103. A regulator 120 and a temperature sensor 130 comprise controller 101.

Referring still FIG. 1, the controller 101 functions by controlling the power supply voltage 102 coupled to the processor 103. The power supply voltage 102 is controlled with respect to the temperature of the processor 103. The controller 101 includes a temperature sensor 130 configured to sense a temperature of the processor 103 and generate a temperature signal in accordance therewith. The regulator 120 functions by providing the power supply voltage 102 to processor 103. The regulator 120 receives temperature information from the temperature sensor 130 and controls the power supply voltage 102 provided to the processor 103 in accordance with the temperature sensed by the temperature sensor 130.

In the present embodiment, the voltage level of power supply voltage 102 is controlled to maintain a stable amount of crosstalk, jitter, noise, and similar harmful effects within the processor 103 (e.g., caused by excessive electron mobility due to the temperature of the semiconductor material comprising the processor 103).

It should be noted that processor 103 can comprise different types of integrated circuit devices. Examples include a graphics processing unit (GPU), a digital signal processor (DSP), a conventional central processing unit (CPU), and the like. In each of such integrated circuit devices, the level of component integration is typically very high (e.g., tens of millions of transistors), along with the clock frequency and thermal dissipation requirements. Each of such integrated circuit devices benefit from the stable level of crosstalk, jitter, noise, and the like, across a temperature range, as provided by embodiments of the present invention. Additional descriptions of crosstalk induced by thermal effects are provided in the discussions in FIGS. 5A–C below.

Figure 2:
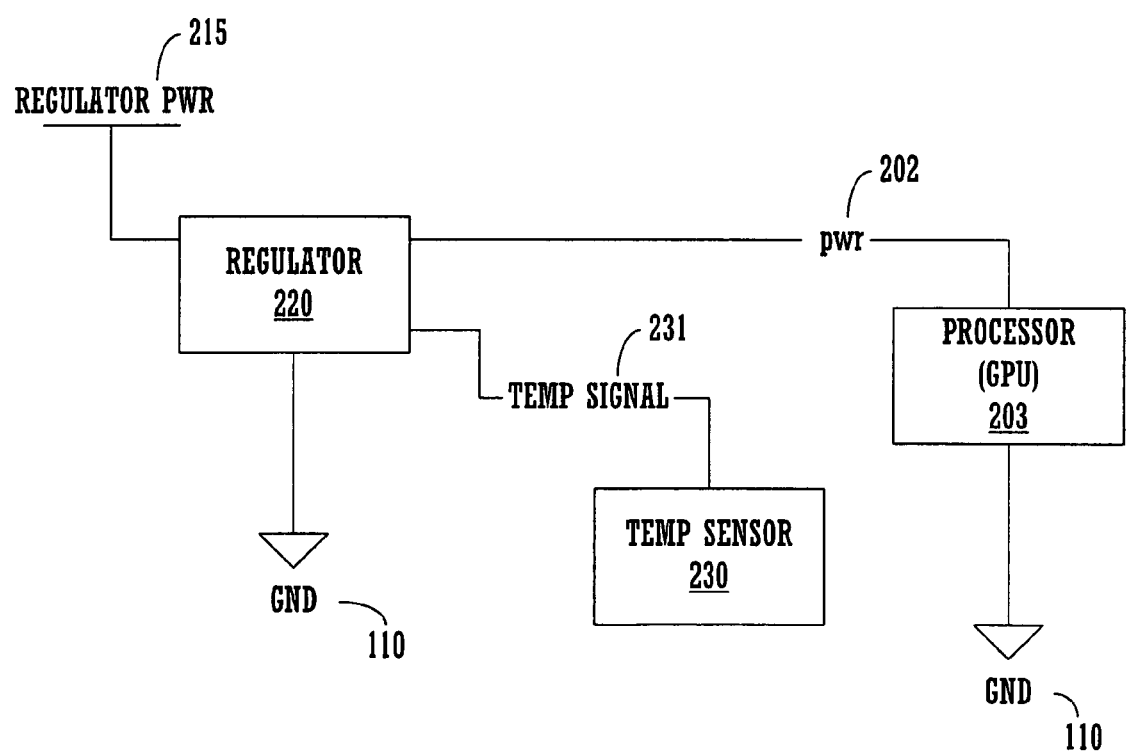
FIG. 2 shows a more detailed configuration of a dynamic power supply adjustment system in accordance with one embodiment of the present invention.

FIG. 2 shows a system 200 in accordance with one embodiment of the present invention. As depicted in FIG. 2, system 200 shows a regulator 220 configured to receive a temperature signal 231 from a temperature sensor 230.

The system 200 embodiment shows the regulator 220 coupled to use a first power supply, regulator power 215, to generate a dynamically adjustable power supply, power 202, coupled to a processor 203. The regulator 220 and the processor 203 are coupled to a common ground 110, and the power supply 202 is generated with respect to the ground 110. The temperature sensor 230 functions by sensing the temperature of the processor 203 and transmitting a temperature signal 231 to the regulator 220 in accordance therewith. In response to the temperature signal 231, the regulator 220 uses the regular power 215 to generate the processor power 202. As described above, the power 202 is dynamically adjusted by the regulator 220 in accordance with changing temperature conditions of the processor 203. The power 202 is adjusted to maintain a stable level of crosstalk, jitter, noise, and the like, as the temperature conditions of the processor 203 change.

Figure 3:
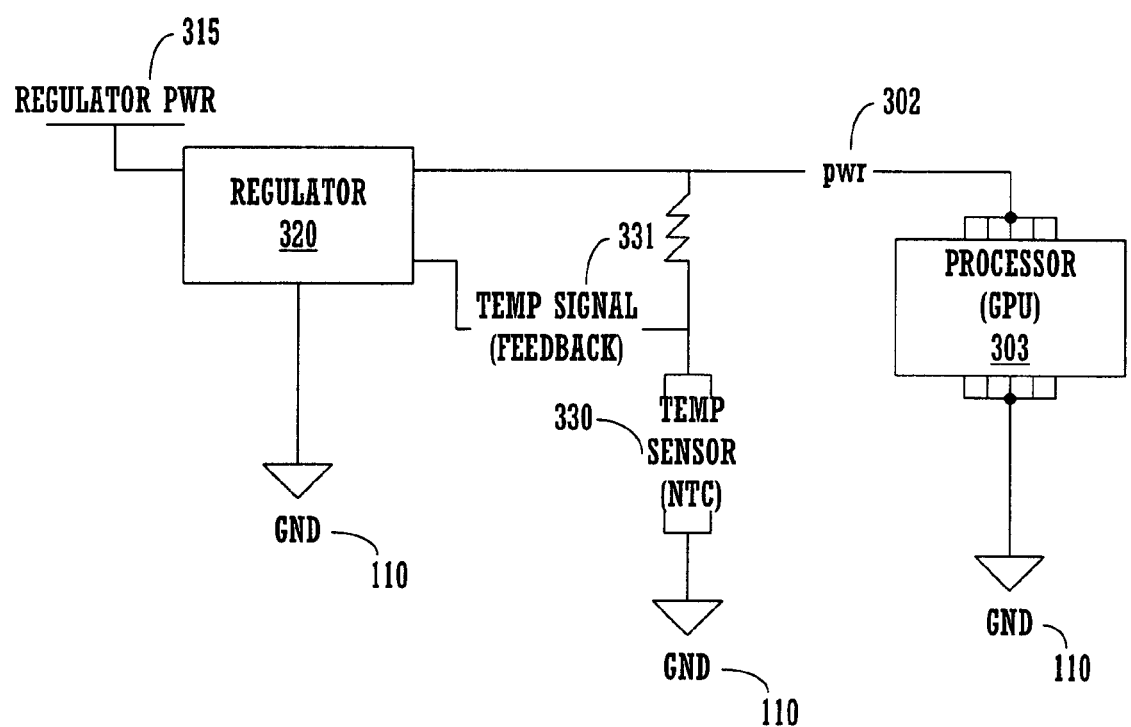
FIG. 3 shows a second detailed embodiment of a dynamic power supply adjustment system in accordance with the present invention.

FIG. 3 shows a system 300 and accordance with one embodiment of the present invention. As depicted in FIG. 3, system 300 shows a temperature signal 331 coupled to a regulator 320, as generated by a feedback circuit controlled by a temperature sensor 330.

System 300 includes a feedback circuit comprising a resistor 332 coupling a processor power supply voltage 302 to a temperature signal 331, which is in turn, coupled to the regulator 320 and to ground 110 via the temperature sensor 330. In this configuration, the temperature sensor 330 controls the feedback circuit to generate the temperature signal 331. In this embodiment, the temperature sensor 330 comprises a negative temperature coefficient resistor (e.g., thermistor). Alternatively, other temperature sensitive circuit elements could be used to implement the temperature sensor 330, such as, for example, other types of temperature sensitive resistors, thermal diodes, thermocouples, and the like. The power 302 is adjusted to maintain a stable level of crosstalk, jitter, noise, and the like, as the temperature conditions of the processor 303 change. Additionally, FIG. 3 shows the processor 303 having a plurality of inputs coupled to receive the power supply voltage 302. Similarly, processor 303 is shown having a plurality of connections to the ground 110.

Figure 4A:
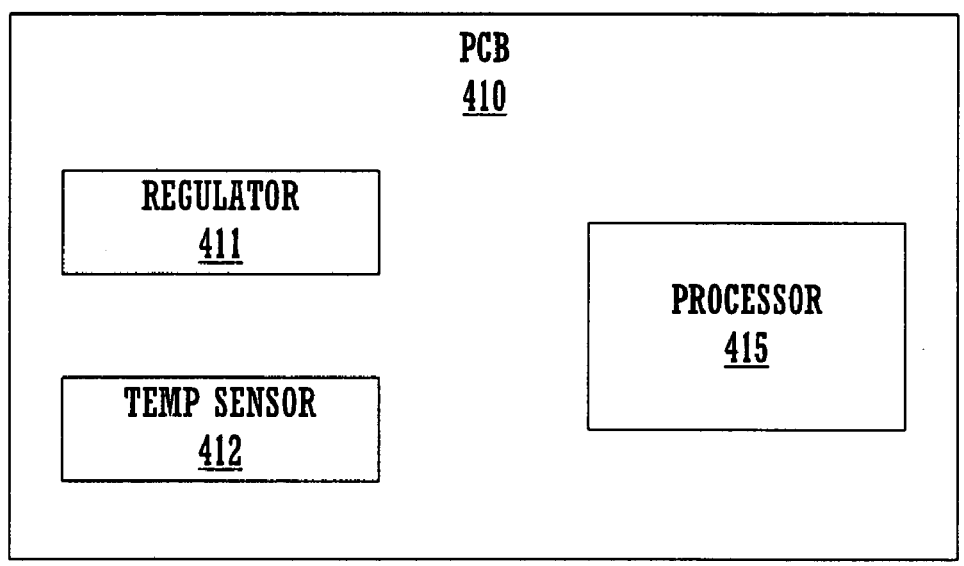
FIG. 4A shows a first configuration of a dynamic power supply adjustment system in accordance with one embodiment of the present invention.

FIGS. 4A, 4B, 4C, and 4D show a plurality of different exemplary system configurations in accordance with embodiments of the present invention. Referring to FIG. 4A, a system 410 embodiment is shown wherein a regulator 411, temperature sensor 412, and processor 415 are mounted on a common print circuit board (PCB). In this embodiment, the temperature sensor 412 senses the temperature of the processor 415 as mounted on the common PCB.

Figure 4B:
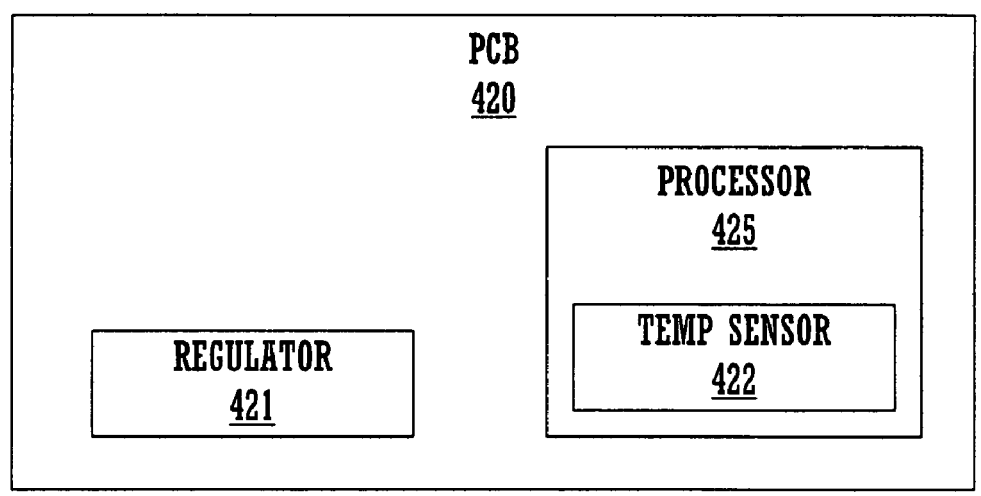
FIG. 4B shows a second configuration of a dynamic power supply adjustment system in accordance with one embodiment of the present invention.

Referring to FIG. 4B, a system 420 embodiment is shown where a temperature sensor 422 is mounted directly onto a processor 425. In this embodiment, the temperature sensor 422 can be mounted directly on the packaging of the processor 425, or, for example, mounted on or within a heat sink coupled to processor 425. Alternatively, the temperature sensor 422 can be integrated directly within the die of processor 425 in order to more directly sense the temperature. In this embodiment, the regulator 421 remains on the PCB.

Figure 4C:
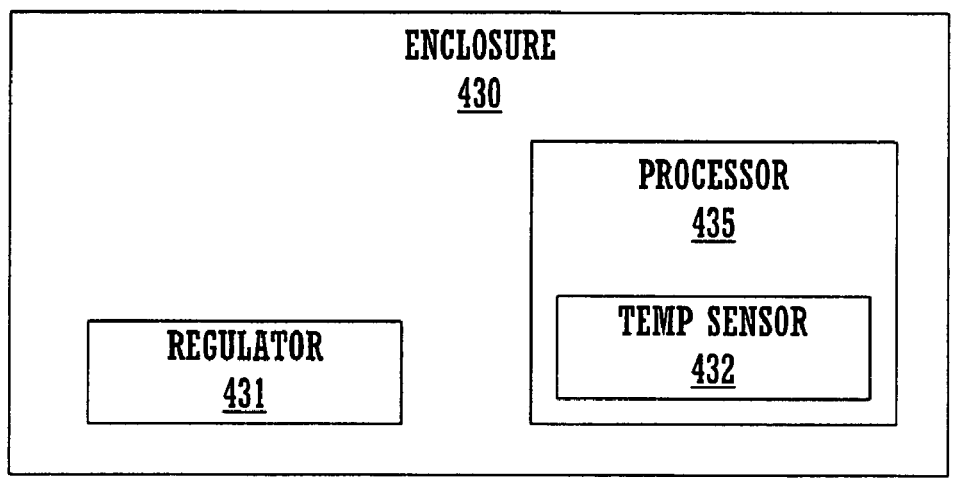
FIG. 4C shows a third configuration of a dynamic power supply adjustment system in accordance with one embodiment of the present invention.

Referring to FIG. 4C, a system 430 embodiment is shown where a temperature sensor 432 is mounted on a processor 435 within a common enclosure. The common enclosure also includes the regulator 431. As with system 420, the temperature sensor 432 of system 430 can be coupled to the processor 435 in a number of different ways (e.g., mounted on the processor packaging, heat sink, integrated directly within the processor die, and the like).

Figure 4D:
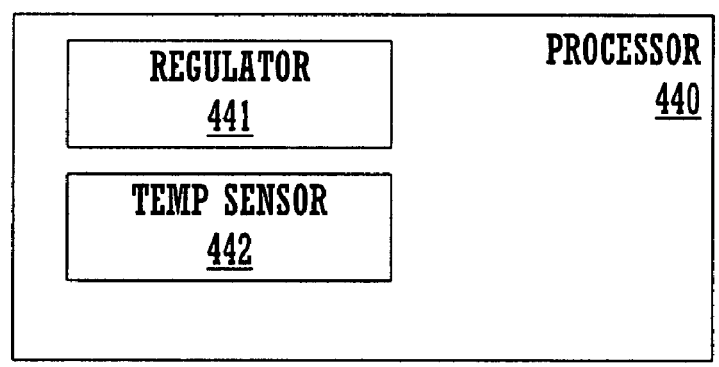
FIG. 4D shows a fourth configuration of a dynamic power supply adjustment system in accordance with one embodiment of the present invention.

Referring to FIG. 4D, a system 440 embodiment is shown where both a regulator 441 and a temperature sensor 442 are mounted on a processor. As with system 420 and system 430, the temperature sensor 442 and regulator 441 can be mounted directly on the packaging of the processor, or, for example, mounted on or within a heat sink coupled to processor. Alternatively, both the temperature sensor 442 and the regulator 441 can be integrated directly within the die of processor.

Figure 5A:
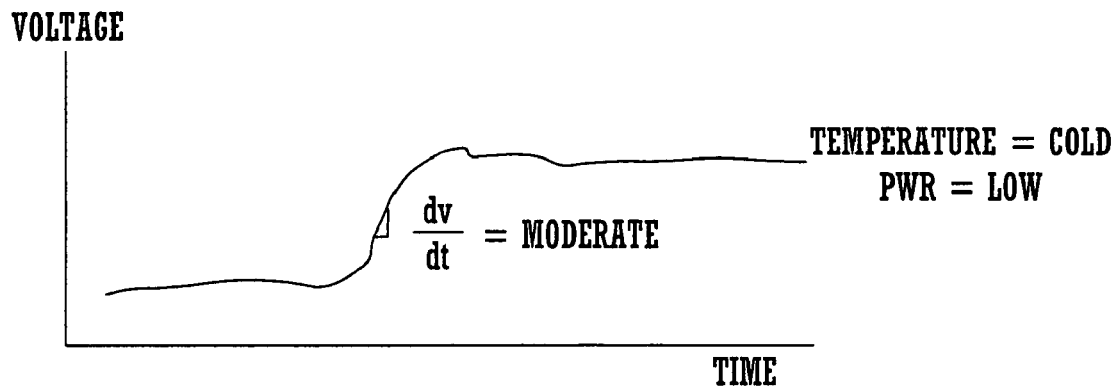
FIG. 5A shows a first graph of a signal edge of a dynamic power supply adjustment system in accordance with one embodiment of the present invention.
Figure 5B:
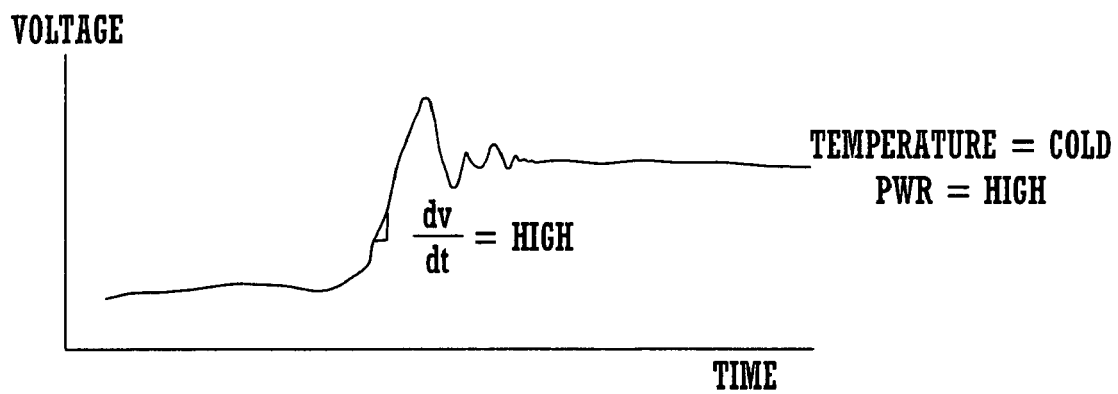
FIG. 5B shows a second graph of a signal edge of a dynamic power supply adjustment system in accordance with one embodiment of the present invention.
Figure 5C:
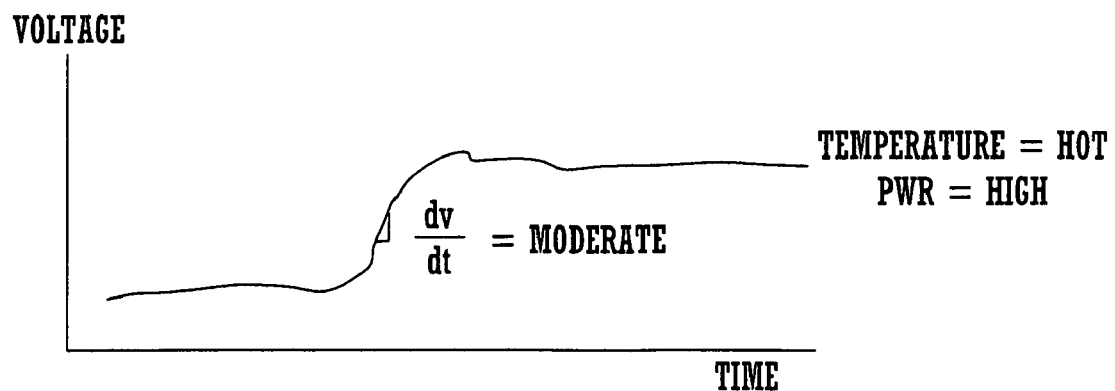
FIG. 5C shows a third graph of a signal edge of a dynamic power supply adjustment system in accordance with one embodiment of the present invention.

FIGS. 5A, 5B, and 5C show respective graphs of the rising edges of a signal of a processor (e.g., processor 103 of FIG. 1) in accordance with one embodiment of the present invention. FIG. 5A shows a case where the processor power supply voltage (e.g., pwr 102 of FIG. 1) is controlled to a low state, as would occur when the semiconductor material of the processor is cold (e.g., at initial power up). As known by those skilled in the art, the ramp rate of a typical signal (e.g., a clock signal) is a function of power supply voltage and temperature, as shown by the relationship $dV/dt=f(Vdd, T)$, where $dV/dt$ is the rate of change of voltage of the signal with respect to time, Vdd is the processor power supply voltage, and T is temperature. As shown in FIG. 5A, the rising edge of the signal ramps at a moderate rate and has a relatively low amount of jitter, crosstalk, etc. For comparison, FIG. 5B shows a case where the temperature of the semiconductor material comprising the processor is cold and the processor power supply throttling function is turned off (e.g., processor power supply voltage is set to a static high level). In this case, since the functionality the present invention is turned off, a significant amount of jitter is evidenced in the rising edge of the signal. The ramping of the rising edge is very rapid, causing a significant amount of current to flow. The large currents cause a significant amount of ringing, crosstalk, etc.

FIG. 5C shows a case where the temperature of the semiconductor material comprising the processor is hot (e.g., after a number of hours of steady-state operation). In this case, the processor power supply voltage is controlled to a high level to counteract the "slowness" of the hot semiconductor material. As shown in FIG. 5C, the rising edge of the signal ramps smoothly. The embodiments of the present invention function by implementing a smooth transition from an initial state, as shown in FIG. 5A, to a continuous, main operating state, as shown in FIG. 5C. The thermal transient from a cold state to a hot state is managed by embodiments of the present invention to prevent jitter, crosstalk, noise, and the like.

Figure 6:
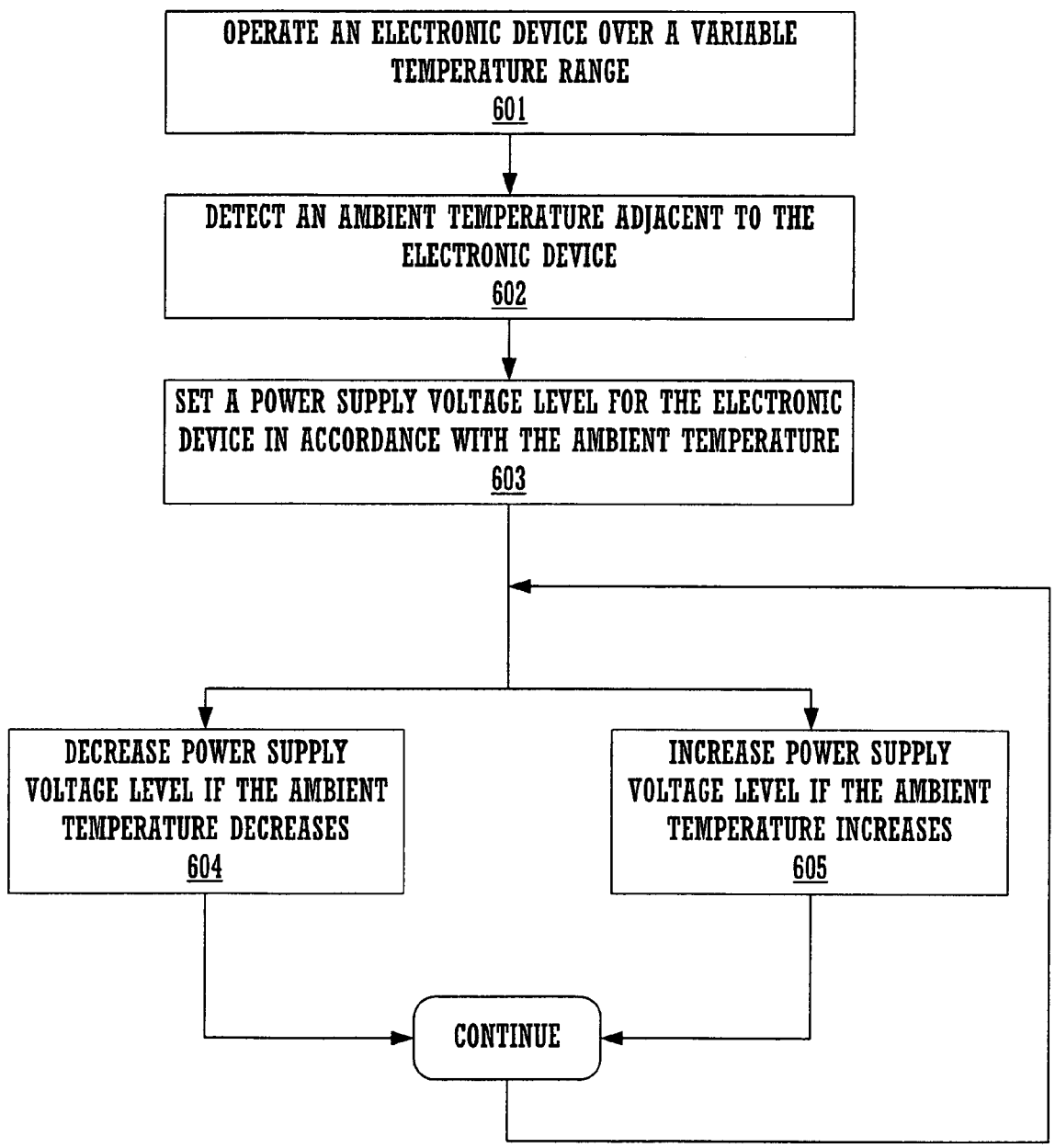
FIG. 6 shows a flow chart of the steps of a dynamic power supply adjustment process in accordance with one embodiment of the present invention.

FIG. 6 shows a flow chart of the steps of a process 600 in accordance with one embodiment of the present invention. As depicted in FIG. 6, process 600 shows the operating steps of a system (e.g., system 100 FIG. 1) for regulating an amount of crosstalk of an electronic device (e.g., processor 103 of FIG. 1).

Process 600 begins in step 601, where an electronic device is operated over a variable temperature range. In step 602, an ambient temperature adjacent to electronic device is detected. As described above, a temperature sensor (e.g., temperature sensor 130) or other temperature sensitive device is used to sense the temperature of the electronic device. In this case, the temperature of the electronic device is sensed by sensing the ambient temperature adjacent to the electronic device (e.g., within a common enclosure, on a common PCB, or the like). In step 603, a power supply voltage is set in accordance with the sensed ambient temperature.

In steps 604 and 605, dynamic adjustment continues, where, in response to to sensing the ambient temperature, power supply voltage is increased if said ambient temperature increases decreased if ambient temperature decreases. As described above, the dynamic adjustment is performed to regulate crosstalk of the electronic device.

Thus, embodiments of the present invention provid a method and system for dynamically controlling power supply voltage coupled to an integrated circuit in response to changing temperature of the integrated circuit. Embodiments of the present invention maintain a stable level of crosstalk, jitter, noise, and the like, across a temperature range, thereby enabling an optimum balance of design factors such as increased component density, increased clock speed, and increased heat dissipation to obtain maximum performance. Embodiments of the present invention reduce the performance limiting effects of crosstalk, jitter, and noise caused by changing temperature.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A processor power supply voltage controller comprising:
   a temperature sensor configured to sense a temperature of a processor and generate a temperature signal in accordance therewith; and
   a regulator coupled to provide a power supply voltage to the processor, the regulator coupled to receive the temperature signal and control the power supply voltage, wherein the regulator controls the power supply voltage to maintain a substantially stable crosstalk level within the processor.

2. The controller of claim 1 wherein the temperature sensor further comprises a negative temperature coefficient resistor.

3. The controller of claim 2 further comprising:
   a feedback circuit coupled to the negative temperature coefficient resistor, the feedback circuit configured to generate the temperature signal for the regulator.

4. The controller of claim 1 wherein the temperature sensor further comprises a thermal diode circuit.

5. The controller of claim 1 wherein the temperature sensor is configured to sense the temperature of the processor by sensing a temperature of a heat sink coupled to the processor.

6. The controller of claim 1 wherein the temperature sensor is configured to sense the temperature of the processor by sensing a temperature of an enclosure including the processor.

7. The controller of claim 1 wherein the temperature sensor is configured to sense the temperature of the processor by sensing a die temperature of the processor.

8. A system for maintaining a crosstalk level within a processor over a variable temperature range, said system comprising:
   a temperature sensor configured to sense a temperature of a processor and generate a temperature signal in accordance therewith; and
   a regulator coupled to provide a power supply voltage to the processor, the regulator coupled to receive the temperature signal and control the power supply voltage, wherein the regulator controls the power supply voltage to maintain a substantially stable crosstalk level within the processor.

9. A system as described in claim 8 wherein said processor is a semiconductor integrated circuit.

10. A system as described in claim 9 wherein said processor is a central processing unit.

11. A system as described in claim 9 wherein said processor is a graphics processing unit.

12. A system as described in claim 8 wherein said temperature sensor is a negative thermal coefficient (NTC) resistor coupled in feedback to said regulator.

13. A system as described in claim 8 wherein said temperature sensor is a thermistor.

14. A system as described in claim 8 wherein said regulator is a switch mode power supply circuit.

15. A system as described in claim 8 wherein said temperature sensor, said regulator and said electronic device are all mounted on a common electronic PC board.

16. An electronic system comprising:
   a temperature sensor configured to sense a temperature of a processor and generate a temperature signal in accordance therewith; and
   a regulator coupled to provide a power supply voltage to the processor the regulator coupled to receive the temperature signal and control the power supply voltage to maintain a substantially stable crosstalk level within the processor.

17. A system as described in claim 16 wherein said regulator, in response to said temperature, increases said power supply voltage when said temperature increases and wherein said regulator, in response to said temperature, decreases said power supply voltage when said temperature decreases.

18. A system as described in claim 17 wherein said processor is a central processing unit.

19. A system as described in claim 17 wherein said processor is a graphics processing unit.

20. A system as described in claim 19 wherein said temperature sensor is a negative thermal coefficient (NTC) resistor coupled in feedback to said regulator.

21. A system as described in claim 19 wherein said temperature sensor is a thermistor.

22. A system as described in claim 19 wherein said regulator is a switch mode power supply circuit.

23. A system as described in claim 19 wherein said temperature sensor, said regulator and said processor are all mounted on a common electronic printed circuit board.

* * * * *